Figure 1:
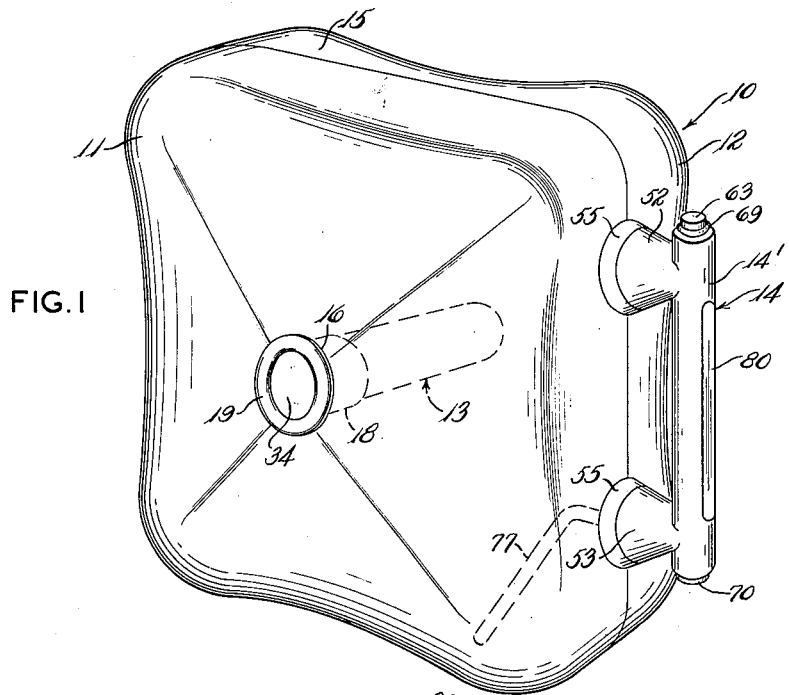

Sept. 7, 1965         J. B. MAILLIE         3,204,822
FLUID PRESSURE REGULATING DEVICE
Filed Feb. 20, 1963                    4 Sheets-Sheet 1

United States Patent Office 3,204,822
Patented Sept. 7, 1965

3,204,822
FLUID PRESSURE REGULATING DEVICE
James Berton Maillie, Akron, Ohio, assignor to The Firestone Tire & Rubber Company, Akron, Ohio, a corporation of Ohio
Filed Feb. 20, 1963, Ser. No. 259,986
17 Claims. (Cl. 222—52)

The invention relates generally to devices for maintaining fluid under controlled pressure, and more particularly to improved pressure regulating devices responsive to bodily resilient contractibility of an enclosure wall thereof. The invention is exemplified in a bodily resilient container having a stressed wall portion contractible due to a pressure change therein for causing controlled communication between an associated high pressure vessel and the container.

The invention is particularly adapted to devices for containing and dispensing bulk carbonated beverages over a substantial period of time. Certain prior attempts to develop such a dispenser which would be suitable for home use have not been satisfactory for a number of reasons. For example, systems wherein both beverage and gas occupy the same chamber have been impractical because carbonation pressure must vary substantially to compensate for the loss of beverage volume withdrawn. Thus, initial pressure is necessarily very high, requiring vessels of uneconomic size and strength, and resulting in excessive foaming at the spigot.

These difficulties are not reduced in systems which separate the gas and beverage by plastic bags, even though they are able to control the amount of carbon dioxide actually in solution.

Other systems have utilized pressurizing gases which liquefy at relatively low pressures. By separating the gas from the beverage by flexible diaphragms, they effectively resolve the problems noted above; but they introduce other problems just as troublesome. The liquefying gases are either explosive or they are prohibitively expensive, and in either case they are unacceptable to the beverage industry. The flexible diaphragms are difficult to install, clean and re-use, and even more difficult to inspect and replace.

In all prior constructions of which I am aware, precise control of the pressure maintained on the stored beverage has not been accomplished, and consequently uniform carbon dioxide content—one of the most critical elements affecting beverage quality—is not maintained in drinks dispensed at intervals over a substantial period of time, which may be hours, days, weeks, or even months.

It is a general object of the present invention to provide a novel and improved self-regulating fluid pressure container which is capable of maintaining a predetermined internal pressure accurately within unusually narrow limits.

More specifically, it is an object to provide an improved self-regulating dispenser for carbonated beverages which does not require a flexible diaphragm or plastic bag with the attendant aforesaid disadvantages.

Another object is to provide an improved self-regulating dispenser utilizing a rigid pressure vessel containing carbon dioxide under high pressure preferably mounted within a resilient outer vessel for maintaining uniform carbon dioxide content in a beverage stored in the outer vessel.

A further object is to provide an improved self-regulating dispenser adapted to store replacement carbon dioxide in liquid form and extract it in gaseous form to compensate precisely for loss of beverage volume withdrawn.

A still further object is to provide an improved self-regulating container having a bodily contractible outer vessel controlled by internal pressure to feed replacement gas from the inner into the outer vessel.

Another object is to provide an improved self-regulating dispenser having a novel handle and spigot fitting the outer vessel and incorporating an adjustable and tamper-resistant safety pressure release mechanism.

Still another object is to provide a novel filling valve in a high pressure vessel embodying a tamper-resistant safety pressure release mechanism.

A further object is to provide an improved outlet valve fitting for the high pressure vessel embodying a capillary pick-up tube for protecting the outlet valve seat.

A still further object is to provide a self-regulating container having a safe, novel, practical, and economic means of filling, containing and sealing fluids at sharply differential pressures, and of controlling pressures and flows thereof.

A further object is to provide adjustable means of automatically regulating internal pressure in a container, refrigerating the contents somewhat if desired, and automatically correcting the pressure for temperature changes, thus assuring consistent absolute carbonation in the contents throughout the normal range of operating temperatures.

These and other objects are accomplished by the parts, improvements, combinations of parts, shapes, constructions and arrangements comprising the present invention, a preferred embodiment of which is shown and described herein by way of example as disclosing the best known mode of carrying out the invention. Various modifications and applications of the principles of the invention are comprehended within the scope of the appended claims.

In general, the exemplary form of the invention disclosed comprises a resilient bodily contractible low pressure container having a dispensing spigot and containing a carbonated beverage at relatively low predetermined pressure, a rigid high pressure vessel containing carbon dioxide under high pressure associated with said container and having a valve for feeding high pressure gas into the outer vessel, said valve being opened by contraction of the outer vessel wall due to a decrease of internal pressure thereon by withdrawal of beverage, and said valve being closed by expansion of said outer vessel wall when said predetermined pressure is restored in said low pressure container. The high pressure vessel preferably contains liquid and gaseous carbon dioxide, but is internally arranged to feed only gas at accommodatable volume through the valve. A spigot fitting may be mounted on a wall of the container.

Figure 2:
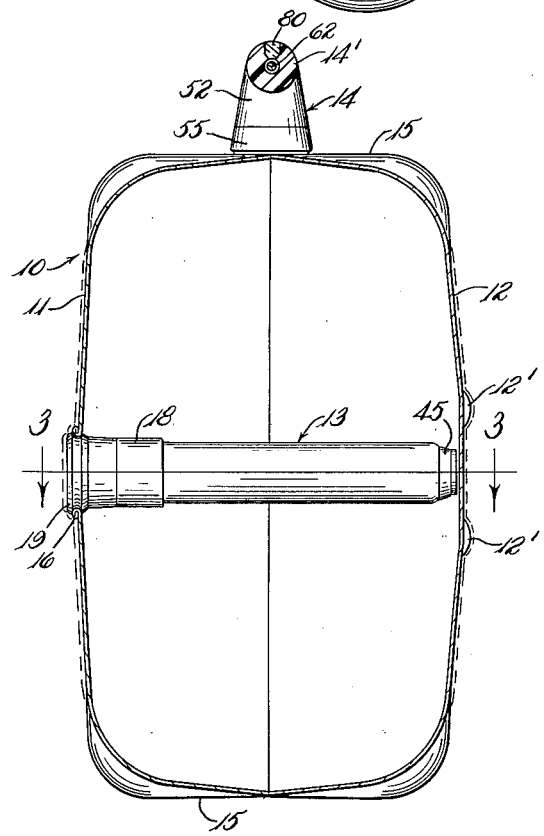
Figure 3:
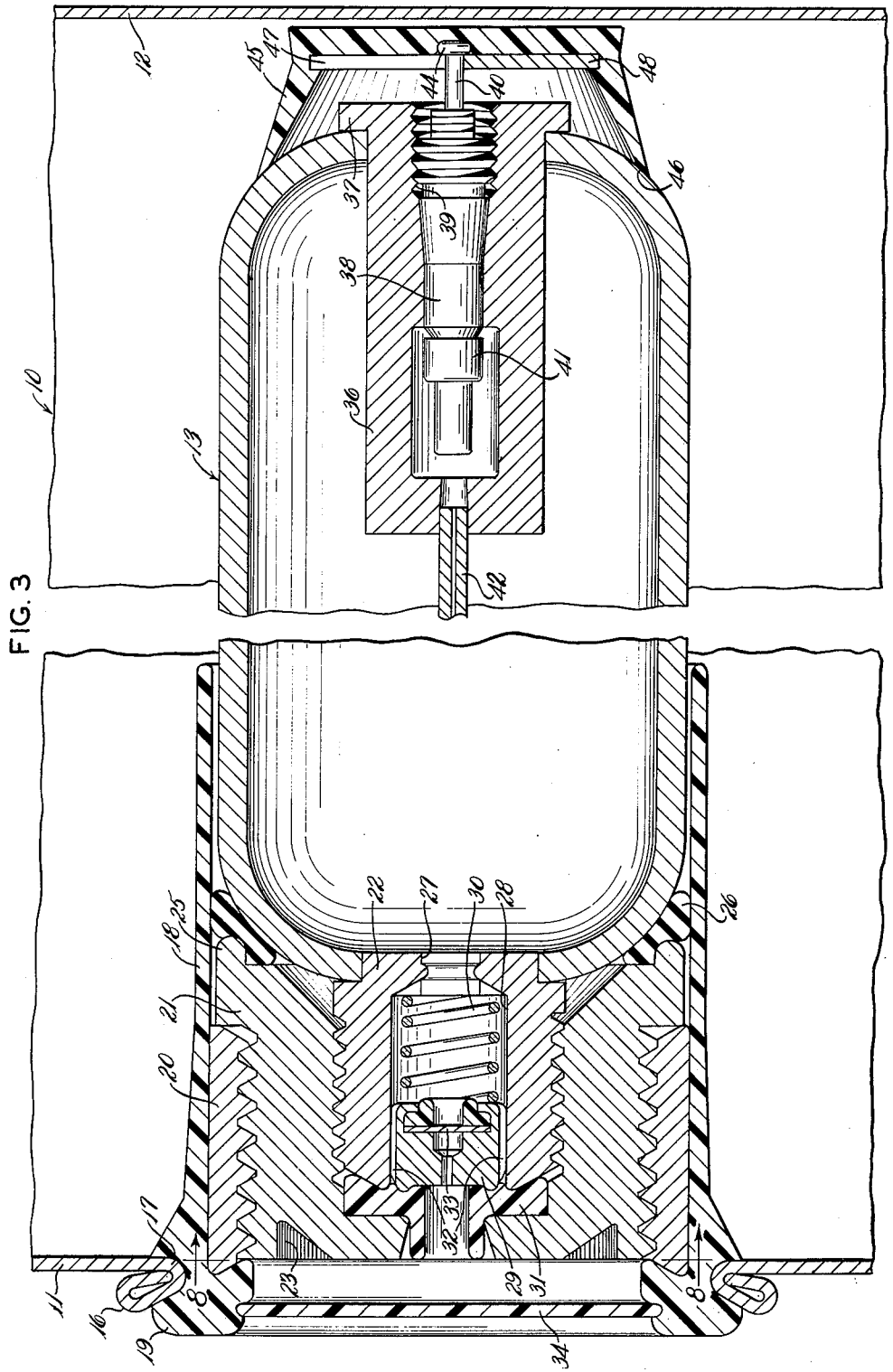
Figure 4:
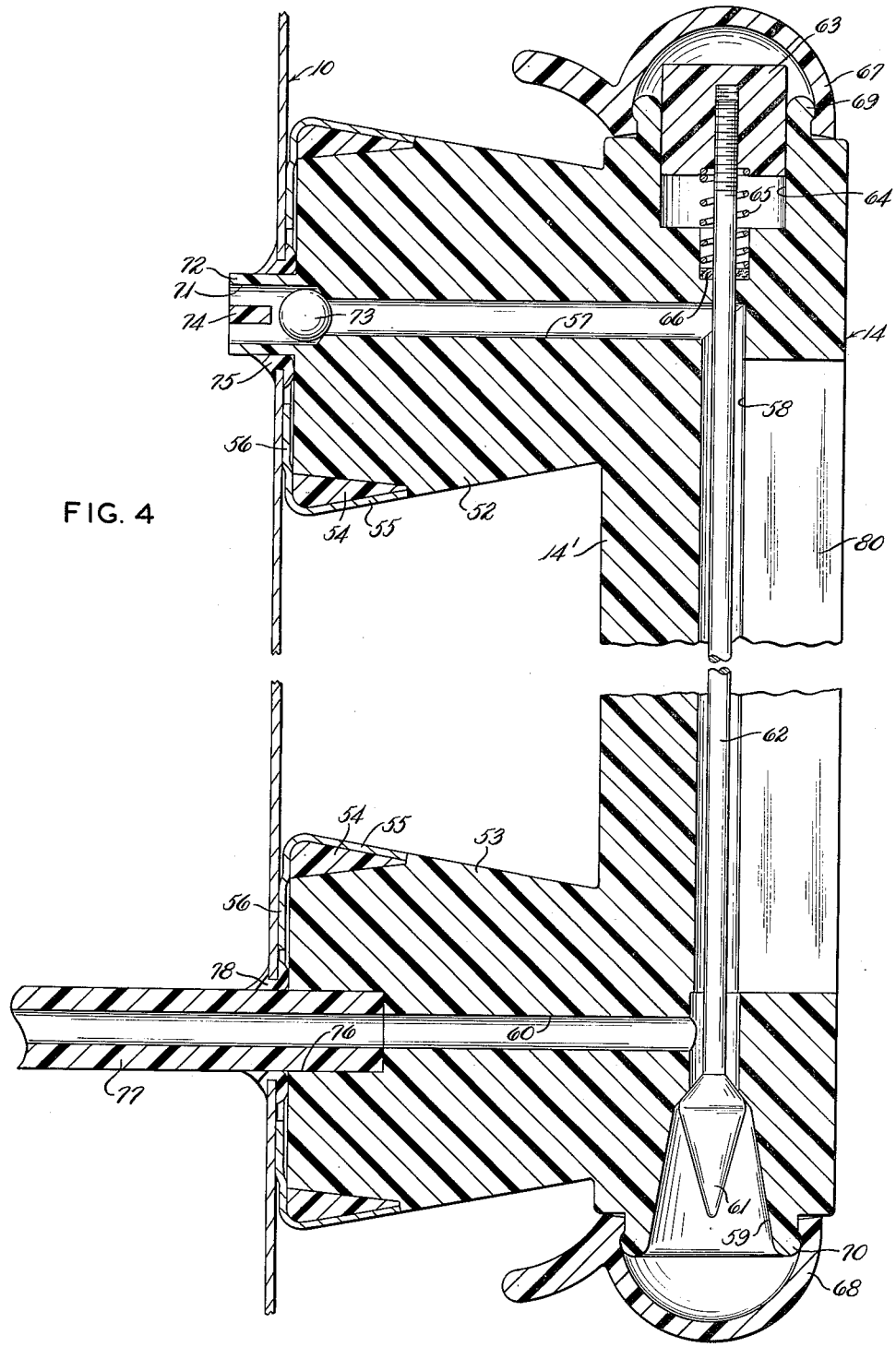
Figure 5:
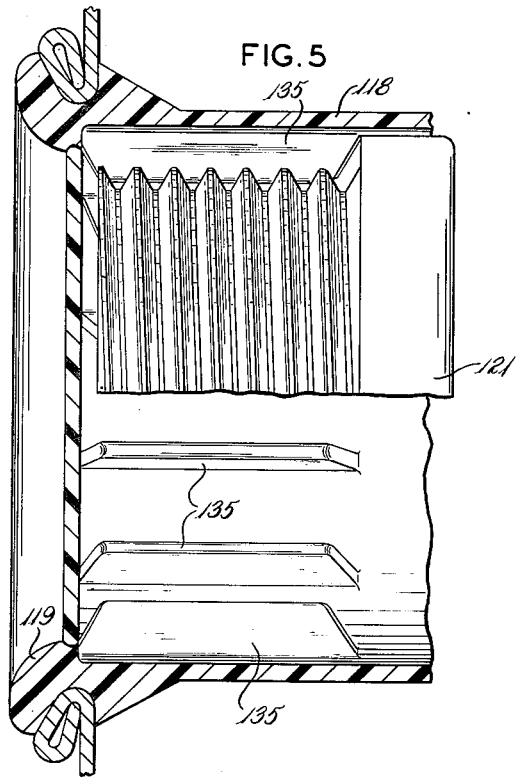
Figure 6:
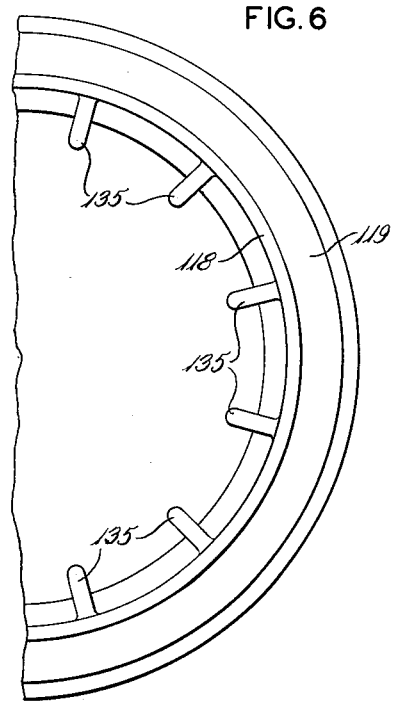
Figure 7:
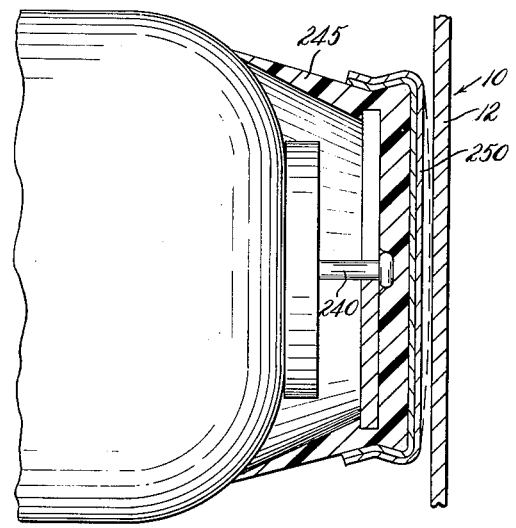
Figure 8:
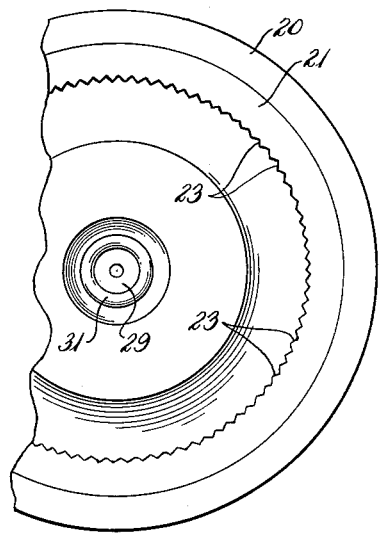

In the drawings:
FIG. 1 is a perspective view of the invention as embodied in a home dispenser of carbonated beverages.
FIG. 2 is a horizontal sectional view thereof, rotated 90°.
FIG. 3 is an enlarged cross section on line 3—3 of FIG. 2, partly broken away.
FIG. 4 is an enlarged fragmentary cross section of the handle portion of the dispenser shown in FIG. 1.
FIG. 5 is a fragmentary view similar to the front or inlet portion of FIG. 3, showing a modification thereof.
FIG. 6 is a rear end elevation thereof, with the inner valve cap removed.
FIG. 7 is a fragmentary view similar to the rear portion of FIG. 3, showing a modification thereof.
FIG. 8 is a fragmentary elevation as on line 8—8 of FIG. 3, showing the front face of the inner valve cap.

Referring first to FIGS. 1 and 2, the low pressure container of the dispenser, indicated generally at 10, preferably comprises a shell having a rounded, substantially rectangular shape. The shell 10 may be formed in two opposing halves 11 and 12 peripherally welded together, and may be of the order of 1/32" thick. At least one wall portion of the shell is stressed to resiliently maintain a bulged cross-sectional shape within the operating range of pressure required for carbonation, and to laterally contract due to internal tension stresses in the wall portion as the pressure decreases. The lateral contraction causes the rear wall 12 of the shell to contact and automatically open a valve in the high pressure vessel or cartridge indicated generally at 13 and feed carbon dioxide into the outer container 10 to replace the volume of beverage withdrawn. The cartridge 13 is preferably formed of stainless steel of sufficient gauge to withstand relatively high internal pressures.

The front wall 11 of the low pressure shell 10 has a central bung opening in which the inlet end of the cartridge 13 is mounted as best shown in FIG. 3. The handle is indicated generally at 14. The transversely flat portions 15 on the outer shell are adapted to maintain the container in a stable position, as shown in FIGS. 1 and 2.

Referring to FIG. 3, the bung opening in the wall 11 of shell 10 may have outwardly rolled bead portions indicated at 16 and an annular shoulder rim 17 forming the bung opening. The bung sleeve 18 seated in the opening is preferably of suitable plastic material such as nylon, having a grooved enlarged collar 19 in which the shoulder 17 is seated. Preferably, a split internally threaded bushing 20 fits within the bung sleeve 18. The bushing is designed to resiliently press the collar 19 against the bung rim 17.

The inlet valve cap 21 is screwed in the bushing 20 and mounts the high pressure cartridge 13 for axial adjustment toward and away from the rear wall 12 of the container shell. Alternatively, the valve cap could be screwed into an internal thread system provided integrally in the bung sleeve 18 instead of in the separate bushing 20.

As shown, the inner end of cap 21 abuts the inlet end of the cartridge 13, and the inlet valve fitting 22 projecting forwardly from the cartridge wall is screwed axially into the valve cap 21. The front or outer face of the valve cap has an annular groove with circumferentially arranged serrations 23 (FIGS. 3 and 8) which are adapted to be frictionally engaged by a suitable spanner wrench for turning the valve cap in the bushing 20, and adjusting the position of the cartridge 13 relative to the wall 12.

The rear end of the valve cap 21 has an annular flange 25 extending rearwardly therefrom which abuts an O-ring type gasket 26 interposed between cartridge 13 and the bung sleeve 18, forming a fluidtight seal against leakage of the contents of the container 10 around the valve cap.

The inlet valve fitting 22 has an axial bore 27 communicating with the interior of cartridge 13, and within an enlargement 28 of the bore a self-sealing check valve element 29 is axially slidable. The element 29 is urged by spring 30 against an annular seating insert 31 in the inlet end of the valve cap 21. The valve element 29 has outer guide ribs 32 which space it from the bore 28 and allow passage of fluid into the cartridge when the valve element is pushed inwardly away from the seal.

The valve element 29 has an inner bore normally closed by a frangible safety disk 33 designed to rupture if the pressure within the cartridge exceeds a predetermined value, and exhausting the cartridge contents harmlessly to the atmosphere by blowing off the dust cover disk 34 which is resiliently fitted within the collar 19 of the bung sleeve outwardly of the inlet cap 21. The inlet valve and cap assembly is immersible, requires no wrench engagement for the filling operation, and provides a construction of optimum simplicity and economy.

A modified bung sleeve construction for adjustably mounting the inlet valve and cartridge assembly is shown in FIG. 5. In this form the bung sleeve 118 has circumferentially arranged longitudinal splines 135 on its inner surface extending rearwardly from the collar 119. The inner circumference formed by the splines has a susbtantially smaller diameter than the outer diameter of the screw thread on the valve cap 121. Since the cap is of metal and the bung sleeve is of plastic, shallow threads can be formed in the splines by screwing the inlet cap into the splines, and, if desired, the threads can later be stripped to allow removal of the cap by applying a substantial pulling force.

The outlet valve fitting 36 (FIG. 3) is secured as by welding or brazing in the rear end of cartridge 13, and extends axially forward into the cartridge. An annular flange 37 may be provided on the fitting 36 for abutting the end of the cartridge. A gas outlet valve 38 is screwed into the threaded bore 39 of the fitting 36. The valve 38 is similar to a conventional tire valve, having a plunger stem 40 which when depressed will open the valve element 41 away from its seat.

A capillary pick-up tube 42 is secured in the inner end of the fitting 36, and extends forward axially of the cartridge 13 to a point where the flow rate therethrough is controllably reduced when the valve 38 is opened. If the flow rate were not thus reduced, when the valve 38 is opened the force of the escaping high pressure fluid would damage the valve seat.

The head 44 of valve stem 40 is situated within a bonnet 45 of nylon or other suitable mateiral, so that the bonnet actuates the valve stem by the abutment of the rear face of the bonnet with rear wall 12 of the container when it contracts laterally due to a decrease in pressure below a predetermined value, caused by withdrawal of beverage from the container. Preferably, the head 44 of the valve stem is slidably inserted in a slot 47 in a metal disk 48 on the underside of the bonnet. Adjusting the position of the bonnet 45 relative to the wall 12 is accomplished by screwing the valve cap 21 or 121 in the bung sleeve, as previously described. As shown, in FIG. 2, reinforcing dimples 12' may be provided in wall 12 around the area contacted by valve stem head 44, to guard the contact area against blows directed against the outside of the container.

Bonnet 45 is substantially frusto-conical in shape, and its outer peripheral edge 46 resiliently engages the rear end of the cartridge and provides an enclosed space surrounding the end of the fitting 36 and valve 38 to protect them from contact with the beverage in the container when the valve 38 is closed. When the valve 38 is opened by contact of its stem with container wall 12, the high pressure of the gas discharging through the valve will bend or flare the outer periphery 46 of the bonnet away from the cartridge to allow discharging the gas into the container 10.

The modified form of bonnet 245 shown in FIG. 7 has a bi-metallic disk 250 which may be fitted over the rear face of the bonnet 245 to act as an automatic thermal adjustment of the relationship of valve stem 240 and wall 12, to compensate for changes in said relationship due to variations in temperature. The disk 250 would be calibrated to bend slightly in response to temperature changes, thereby changing the gap between the bonnet and container wall 12, so that the carbonation pressure would be automatically increased or decreased in container 10 to compensate for changes in temperature.

Referring to FIG. 4, the handle 14 is positioned so that its hand grip portion 14' extends along one side of the container 10, and has two perpendicularly spaced posts 52 and 53 anchored to the side of the container. The handle and posts are preferably of suitable plastic material. As shown, each of the posts may be outwardly flared to form an enlarged base adjacent to the container. A double-tapered split plastic ring 54 encircles the outer periphery of each base and resiliently conforms to the inner surface of a tapered flange 55 on a sheet metal socket 56, the face of which abuts the side wall of container 10.

The post 52 has an axial passageway 57 which connects to the upper end of a vertical passageway 58 in the vertical handle portion 14'. The lower end of passageway 58 connects with a flared spigot opening 59 at the bottom of the handle portion 14', and an axial passageway 60 in the post 53 connects to passageway 58 just above the opening 59. A spigot valve 61 in opening 59 normally closes passageway 58, and has a stem 62 extending through passageway 58 to connect with a push button 63 slidable in a socket 64 at the top of the handle portion 14'. A helical spring 65 urges the button upwardly and abuts a sealing gasket 66 encircling the rod. Detachable snap-on caps 67 and 68 normally cover the push-button 63 and spigot opening 59, respectively, and are resiliently engaged over annular projecting beads 69 and 70 on the top and bottom of the handle portion 14'.

The passageway 57 in upper post 52 has an enlargement 71 at its inner end formed in a neck 72 which projects through the wall of container 10. A ball check 73 in enlarged passage 71 is adapted to close off passageway 57, and a cross member 74 in said passage 71 keeps the ball in close proximity to its seat. A grommet 75 encircling the neck 72 provides a seal around the opening in the container wall through which the neck extends.

The passageway 60 in lower post 53 has a reentrant bore 76 in which the upper end of a dip tube 77 is secured. A grommet 78 encircling the dip tube provides a seal around the opening in the container wall through which the dip tube extends. Within the container 10 the dip tube 77 is bent downwardly and terminates at the bottom of the container, as indicated in FIG. 1, so that it is in position to draw liquid beverage from the bottom of container 10.

In operation, if the container is only partly filled with liquid beverage, when it is desired to dispense or draw off some of the liquid, the button 63 is depressed to open the spigot valve 61. The check valve 73 prevents gas in the upper part of the container from discharging into the passageway 58 and out through spigot 59, causing foaming of the beverage. When the button 63 is released the valve 61 closes, and the pressures in passageways 57 and 58 will equalize with that in the container, so that the level of liquid in passageway 58 will be the same as in the container. A transparent window 80 may be provided in handle portion 14' through which the level in passageway 58 may be viewed, thus acting as a visual gauge of the liquid contents of the container.

In filling or refilling the high pressure cartridge 13, a liquid $CO_2$ dispensing fixture may be quick-coupled to the inlet valve 22, and the $CO_2$ forced past valve 29 into the cartridge. The charging may be accomplished by a positive displacement method, checked time or by weighing to assure substantially the desired amount of liquid $CO_2$ being charged into cartridge 13. When the dispensing fixture is uncoupled, the valve 29 seals itself by internal gas and spring pressure.

The container 10 is filled with beverage before inserting the bung sleeve and cartridge assembly therein, and, after inserting the assembly, the desired pressure is introduced into the container through the spigot valve 61 which is held open by depressing push button 63. The container instantly assumes its proper pressurized shape, and valve cap 21 is turned on its threads by a suitable wrench to bring head 44 of the valve stem 40 into contact with the wall 12 of the container. This initiates the flow of gas from cartridge 13 into the container and increases the pressure therein, causing back pressure ot the spigot.

When the position of the valve head relative to wall 12 has been adjusted to maintain the desired pressure in container 13, the pressure gauge fixture is withdrawn, and the dust cover disk 34 is snapped into the bung. The dispenser is now ready to operate. As the beverage is drawn off from time to time the resilient walls 11 and 12 laterally contract, pushing the valve stem 40 inwardly to feed a replacement volume of $CO_2$ gas under pressure into the beverage container 13. As soon as the desired predetermined pressure is reached in container 13, the wall 12 will be bulged or laterally expanded away from valve stem head 44, allowing feed valve 38 to close by its own spring pressure.

In use, a full dispenser weighs only a fraction of the weight of an equivalent volume of bottled beverage and it is designed for storage on the shelf of a family refrigerator. In the case of soft drinks, the container may be stored and operated either warm or cold.

If for any reason the beverage should become overcarbonated, the user can quickly and easily reduce the carbonation pressure by turning the container upside down and pressing the push button to bleed off excess gas. On the other hand, if more carbonation is desired, exterior pressure can be applied manually to the central area of the container wall 13 to contact the valve stem 58 and introduce more gas from vessel 47. Under normal conditions such expediencies would be wholly unnecessary but might possibly be appropriate if the filling of the container and the consumer use were to occur under sharply different pressure or temperature conditions.

The improved self-regulating dispenser automatically maintains a predetermined internal pressure within narrow limits on stored beverage, and consequently uniform carbon dioxide content in drinks dispensed from time to time from the stored beverage. The improved container is particularly adapted for palletized and automated handling.

Obviously, the invention can be applied to pressure regulating devices operatively responsive to bodily resilient movement derived from tensile stresses in an inclosure wall or a part thereof. Such devices would include bellows and diaphragms of various configurations.

What is claimed is:

1. In combination, a container having an integral tension stressed resilient bodily contractible container wall for containing fluid under relatively low pressure, a vessel for containing fluid under relatively high pressure associated with said container, a discharge valve connecting said vessel with said container and operable by contraction of said wall due to tension stresses therein responsive to a decrease of pressure in said container, and means mounting said valve and said wall in related operating position.

2. In combination, a container for containing fluid under relatively low pressure, said container formed of opposed walls at least one of which is internally stressed under tension to be resiliently bodily contractible toward the other, a vessel for containing fluid under relatively high pressure associated with said container, a discharge valve connecting said vessel with said container and operable by contraction of said contractible wall due to a decrease of pressure in said container, and means exteriorly adjustaby mounting said valve and said contractible wall in related operating position.

3. In combination, a container having a tension stressed resilient bodily contractible wall for containing fluid under relatively low pressure, a vessel for containing fluid under relatively high pressure mounted on said container, a discharge valve on said vessel for supplying high pressure fluid to said container and operable by contraction of said wall due to tension stresses therein responsive to a decrease of pressure in said container, and means adjustably mounting said container and said vessel in related valve-operating position.

4. In combination, a container for containing fluid under relatively low pressure, said container formed of opposed walls at least one of which is internally stressed under tension to be resiliently bodily contractible toward the other, a vessel for containing fluid under relatively high pressure mounted on said container, a discharge valve on said vessel for supplying high pressure fluid to said container and operable by contraction of said wall due to a decrease of pressure in said container, and means adjustably mounting said container and said vessel in related valve-operating position.

5. A fluid pressure regulating device having, a resilient wall portion subjected under tension to the fluid pressure to be controlled, said wall portion being bodily contractible solely by tension stresses therein responsive to changes in said fluid pressure, a source of fluid under relatively high pressure, valve means connecting said pressure source to the fluid pressure to be controlled, said valve means operable by contraction of said wall portion, and means exteriorly adjustably mounting said valve means and said wall portion in related operating position.

6. A fluid pressure regulating device having, a tension stressed resilient wall portion at least partly enclosing fluid pressure to be controlled, said wall portion being bodily contractible due to tension stresses therein responsive to a decrease in said fluid pressure, a source of fluid under different pressure than the desired fluid pressure to be maintained, valve means connecting said pressure source to the fluid pressure to be controlled, said valve means operable by contraction of said wall portion, and means mounting said valve means and said wall portion in related operating position.

7. A carbonated beverage container comprising, an outer vessel for containing carbonated beverage under normal carbonation pressure, said vessel having opposed walls at least one of which is internally stressed under tension to be bodily resiliently contractible toward the other, a vessel within said container for containing carbon dioxide under relatively high pressure, a discharge valve on said inner vessel operable by contact with said contractable wall, and means adjustably mounting said inner vessel within said outer vessel with said valve and said contractible wall in related operating position.

8. A carbonated beverage container comprising, an outer vessel for containing carbonated beverage under normal carbonation pressure, said vessel having opposed walls at least one of which is internally stressed under tension to be bodily resiliently contractible toward the other, a vessel within said container for containing a concentration of carbon dioxide under relatively high pressure, a discharge valve on said inner vessesl operable by contact with a wall of said container, and means adjustably mounting said inner vessel on one wall of the container with said valve in related operating position to the other wall.

9. A container for containing fluid under relatively low pressure and having a resilient bodily contractible wall, a vessel within said container for containing fluid under relatively high pressure, said vessel having a discharge valve adjacent said wall operable by contraction of said wall due to a decrease of pressure in said container, a resilient bonnet normally forming a closed space around the exterior of said valve, and means adjustably supporting said valve and said wall in related operating position.

10. A container for containing fluid under relatively low pressure and having a resilient bodily contractable wall, a vessel within said container for containing fluid under relatively high pressure, said vessel having a discharge valve adjacent said wall, said valve having a valve stem operable by contraction of said wall due to a decrease of pressure in said container, a resilient bonnet carried on the valve stem and normally forming a closed space around the valve, and means adjustably supporting said valve stem and said wall in related operating position.

11. A container for containing fluid under relatively low pressure and having a resilient bodily contractible wall, a vessel within said container for containing fluid under relatively high pressure, said vessel having a discharge valve adjacent said wall, said valve having a valve stem operable by contraction of said wall due to a decrease of pressure in said container, a resilient bonnet carried on the valve stem and normally forming a closed space around the valve, means adjustably supporting said bonnet and said wall in related operating position, and a thermally responsive element on said bonnet for changing the relation between said bonnet and said wall in response to temperature changes in said container.

12. A beverage dispenser comprising walls forming a container for containing carbonated beverage at predetermined normal pressure, at least one of said walls being resiliently bodily contractible toward an opposite wall, a vessel for containing fluid under relatively high pressure mounted on said opposite wall and extending toward said contractible wall, a discharge valve on said vessel in operating relation to said contractible wall, and means accessible externally of said container adjustably mounting said vessel on said opposite wall for adjusting the operating relationship between said valve and said contractible wall.

13. A beverage dispenser comprising walls forming a container for containing carbonated beverage at predetermined normal pressure, at least one of said walls being resiliently bodily contractible toward an opposite wall, a vessel for containing fluid under relatively high pressure within said container and extending toward said contractible wall, a discharge valve on said vessel in operating relation to said contractible wall, a bung sleeve in said opposite wall surrounding the adjacent end of said vessel, sealing means between said sleeve and said container, and means adjustably mounting said vessel in said bung sleeve for adjusting the operating relationship between said valve and said contractible wall.

14. A beverage dispenser comprising walls forming a container for containing carbonated beverage at predetermined normal pressure, at least one of said walls being resiliently bodily contractible toward an opposite wall, a vessel for containing fluid under relatively high pressure within said container and extending toward said contractible wall, a discharge valve on said vessel in operating relation to said contractible wall, a bung sleeve in said opposite wall extending into said container and surrounding the adjacent end of said vessel, an inlet valve projecting from said vessel within said sleeve, and means adjustably mounting said inlet valve in said bung opening for adjusting the relationship between the discharge valve and said contractible wall.

15. A beverage dispenser comprising walls forming a container, at least one of said walls being resiliently bodily contractible toward an opposite wall, a vessel for containing fluid under relatively high pressure within said container, a discharge valve on said vessel for supplying high pressure fluid to said container and operable by contraction of said contractible wall due to a decrease of pressure within said container, and a dispensing spigot mounted on said container and connected to the interior thereof for dispensing the contents of said container.

16. A beverage dispenser comprising walls forming a container, at least one of said walls being resiliently bodily contractible toward an opposite wall, a vessel for containing fluid under relatively high pressure within said container, a discharge valve on said vessel for supplying high pressure fluid to said container and operable by contraction of said contractible wall due to a decrease of pressure within said container, and a dispensing spigot mounted on said container walls, said spigot having a vertical discharge passageway, a dip tube connecting the lower end of said passageway with the bottom portion of said container, a pressure relief passageway connecting the upper end of said discharge passageway to the upper portion of said container, and a check valve in said pressure relief passageway permitting gas flow into said container.

17. In a fluid pressure regulating device having a pressure vessel, an outlet valve fitting on said vessel having a valve and a valve seat, said outlet valve fitting having an elongated capillary pick-up tube extending into said pressure vessel and communicating with said outlet valve, said pick-up tube having a capillary orifice designed to controllably reduce the flow of pressure fluid through the outlet valve in open position to protect the valve seat from the force of exhausting pressure fluid.

References Cited by the Examiner

UNITED STATES PATENTS

| | | | |
|---|---|---|---|
| 350,939 | 10/86 | McNally | 222—471 |
| 682,237 | 9/01 | Brown | 222—396 |
| 1,959,815 | 5/34 | Corcoran | 222—52 |
| 1,987,323 | 1/35 | Carroll et al. | 222—399 X |
| 2,009,467 | 7/35 | Amsdell | 222—396 |
| 2,021,367 | 11/35 | Louis | 222—399 X |
| 2,104,467 | 1/38 | Marzolf | 222—396 |
| 2,187,793 | 1/40 | Rice | 222—496 |
| 2,289,880 | 7/42 | Frank | 222—471 |
| 2,460,915 | 2/49 | Allen | 220—94 |
| 2,656,067 | 10/53 | Mitchell | 220—86 |
| 2,812,109 | 11/57 | Wentz | 222—52 |
| 2,961,122 | 11/60 | Smigo | 220—94 |
| 3,071,287 | 1/61 | Gran | 220—86 |

RAPHAEL M. LUPO, *Primary Examiner*.

LOUIS J. DEMBO, HADD S. LANE, *Examiners*.